(12) United States Patent
Kubo et al.

(10) Patent No.: US 7,582,243 B2
(45) Date of Patent: Sep. 1, 2009

(54) METHOD FOR MANUFACTURING WEATHER STRIP AND MOLDING DEVICE FOR WEATHER STRIP

(75) Inventors: Yoshihisa Kubo, Aichi (JP); Masahiko Ito, Aichi (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 857 days.

(21) Appl. No.: 11/016,945

(22) Filed: Dec. 21, 2004

(65) Prior Publication Data

US 2005/0140054 A1 Jun. 30, 2005

(30) Foreign Application Priority Data

Dec. 26, 2003 (JP) .......................... P2003-433456

(51) Int. Cl.
*B29C 45/14* (2006.01)
(52) U.S. Cl. ........................ 264/261; 264/250; 264/275; 264/334
(58) Field of Classification Search ........................ None
See application file for complete search history.

(56) References Cited

U.S. PATENT DOCUMENTS

2002/0178656 A1 12/2002 Nozaki et al.

2003/0157298 A1 8/2003 Kubo et al.

FOREIGN PATENT DOCUMENTS

| JP | A-58-205749 | 11/1983 |
| JP | UM-A-3-39514 | 4/1991 |
| JP | A-H08-72100 | 3/1996 |
| JP | 10309752 | * 11/1998 |

OTHER PUBLICATIONS

Office Action issued on Jul. 13, 2007 during the prosecution in the corresponding Chinese patent application No. 200410102769.0.

* cited by examiner

*Primary Examiner*—Edmund H. Lee
(74) *Attorney, Agent, or Firm*—Posz Law Group, PLC

(57) ABSTRACT

A molding device for molding a molded portion of a weather strip has a lower mold, an upper mold, a first sliding mold, a second sliding mold, and a core mold. The core mold has a core body and a core holding portion. The core body comprises a molding part, and insertion parts, into which end parts of an extrusion portion are respectively inserted. The core holding portion extends from only a one-side part of the core body. Cutout portions are formed in parts in which the core holding portion is not present. Convex portions of the second sliding mold are fitted thereinto in what is called a zero-abutment state. Upon completion of molding, the second sliding mold is slid to thereby cause a molded portion to perform relative movement with respect to the core mold. Consequently, the core body can extremely easily be removed from the molded portion.

4 Claims, 7 Drawing Sheets

METHOD FOR MANUFACTURING WEATHER STRIP AND MOLDING DEVICE FOR WEATHER STRIP

BACKGROUND OF THE INVENTION

1. Field of the Invention

The present invention relates to a method for manufacturing a weather strip having a hollow seal portion, which is exemplified by, for example, an opening trim weather strip mounted along the peripheral edge of a door opening portion of a vehicle or the like, and also relates to a molding device for a weather strip.

2. Description of Related Art

Hitherto, there has been known a weather strip that has, for example, a cross-sectionally and substantially U-shaped trim portion and a hollow seal portion bulging outwardly from a side wall part or a bottom wall part of the trim portion. Generally, such a weather strip is formed substantially like a ring by joining end parts of one or plural extruded portions formed by extrusion so as to be elongated. That is, in a condition in which the end parts of the extruded portions are supported and fixed in a molding device, a molded portion is formed between the end parts by injection-molding. Thus, the end parts are connected to each other, so that an annular weather strip is formed.

Also, a nonannular weather strip, in which a molded portion is formed at an end part of an extruded portion, has been known. In this case, a terminal portion of the weather strip is constituted by the molded portion, the shape of a cross-section of which gradually changes.

Meanwhile, in the case of the weather strip of the type, which has the molded portion as described above, when the molded portion is formed, it is necessary to preliminarily dispose a core mold member (hereunder abbreviated as a core mold) for forming the hollow seal portion in a cavity of the molding device. This core mold comprises a core body for sealing the seal portion, and also comprises a grip portion protruding from the core body to the outside. Most of the core body is enclosed by an elastic material, such as rubber. Upon completion of molding the molded portion, the core body needs to be drawn out of a molded article. In this case, usually, an opening (or slit) is provided in the molded portion so as to draw the core body from the molded portion when molded.

Generally, it is desirable from the viewpoint of easiness in drawing out the core body to enlarge the slit as much as possible. However, this causes a demerit that the longer the slit becomes, the shape holding performance thereof and the sealing performance of the seal portion are degraded. The technique of longitudinally dividing the core mold member into plural parts (see, for example, JP-UM-A-3-39514) is known as that of eliminating such a defect. According to this technique, first, one of divided core mold members (hereunder abbreviated as a divided core mold) is drawn out therefrom. This enables the remaining divided core molds and a molded article to perform relative displacement. Thus, even when the slit is not elongated very much, the core body can relatively easily be drawn out of the seal portion of the molded portion.

However, according to the aforementioned technique, the divided core molds differ from other kinds of mold members and are relatively susceptive to physically external forces. Thus, when molding is repeatedly performed, the divided core molds are susceptive to damage. Therefore, the divided core molds need performing frequent maintenance operations and may cause increase in the cost thereof. Further, the fact is that according to some configuration of the molding device, even when the core mold is divided, it is still difficult to draw a divided core mold therefrom.

SUMMARY OF THE INVENTION

The invention is accomplished in view of the aforementioned circumstances. Objects of the invention are to provide a method for manufacturing a weather strip, which is enabled to suppress degradation in the shape holding performance and the sealing performance and which is also enabled to achieve enhancement of the workability at manufacture thereof and to suppress increase in the cost thereof, and to provide a molding device for the weather strip.

Hereinafter, means suitable for solving the problems and achieving the objects are described by itemization thereof. Incidentally, descriptions of operations and advantages corresponding and peculiar to such means are appended to the description of configuration thereof as needed.

First Means

According to an aspect of the invention, there is provided a method for manufacturing a weather strip having an extruded portion, which is formed by extrusion and has a base portion and a hollow seal portion formed integrally with the base portion, and a molded portion, which is formed by a molding device provided with plural mold members so as to connect end parts of the extruded portion or as to be connected to an end of the extruded portion and which has a base portion and a seal portion. According to this method, the molded portion having an opening, which is longer than a grip portion, is formed of the grip portion and the other mold members by filling, when the molded portion is formed, a material in a cavity of the molding device in a condition, in which a core mold member including a core body for forming at least the seal portion of the molded portion and also including the grip portion protruding from the core body is set at a predetermined position in the molding device, and performing molding. Further, after molded, the core body is removed from the molded portion by causing the grip portion to perform relative movement in a longitudinal direction thereof in the opening.

According to the first means, when the molded portion is formed, a core mold member including a core body for forming at least the seal portion of the molded portion and also including the grip portion protruding from the core body is used. The core body is set at a predetermined position in the molding device constituted by plural mold members. In this condition, a material is filled into a cavity of the molding device, and the molding is performed. Thus, the molded portion having a part formed into an opening is formed. According to the first means, not only the grip portion but the opening, which is longer than the width of the grip portion and defined by the grip portion and the other predetermined mold members, is formed. That is, the other mold members are separated from the formed molded portion to thereby form a clearance adjoining the grip portion is formed in the opening. Thus, the grip portion is enabled to perform relative movement in the opening. Further, the grip portion and the molded portion are caused to perform relative movement thereby to enable the end edge of the core body to move to the opening or to a part being close to the opening. Thus, the core body can extremely easily be removed from the seal portion of the molded portion. The workability at the manufacture thereof can dramatically be enhanced. Moreover, because the core mold member (the core body in the seal portion, and the grip portion in the opening) and the molded portion are enabled to perform relative movement at the removal thereof, it is unnecessary that the opening is provided so as to be very long. Consequently, the shape holding performance and the sealing performance of the molded portion of the finally obtained weather strip can be prevented from being degraded. Furthermore, it is unnecessary to divide the core mold member (especially, the core body). Thus, a maintenance operation to be performed on the core mold when damaged is not needed very much. Consequently, the cost thereof can be prevented from being increased.

second Means

According to another aspect of the invention, there is provided a method for manufacturing a weather strip having an extruded portion, which is formed by extrusion and has a base portion and a hollow seal portion formed integrally with the base portion, and a molded portion, which is formed by a molding device provided with plural mold members so as to connect end parts of the extruded portion or as to be connected to an end of the extruded portion and which has a base portion and a seal portion. According to this method, in a condition, in which both or one of ends of the seal portion of the extruded portion are fitted onto both or one of ends of a core body of a core mold member including the core body extending along a longitudinal direction of the seal portion so as to form at least the hollow seal portion of the molded portion and also including the grip portion protruding from the core body so as to intersect therewith, the core mold member is set at a predetermined position in the molding device, and a material is filled into a cavity of the molding device to thereby perform molding, so that the molded portion having an opening, which is longer than the grip portion, is formed of the grip portion and the other mold members. After molded, the core body is removed from the molded portion by causing the grip portion to perform relative movement in a longitudinal direction thereof in the opening.

According to the second means, in a condition, in which both or one of ends of the seal portion of the extruded portion are fitted onto both or one of ends of the core body, the core mold member is set at a predetermined position in the molding device. In this condition, the material is filled into the cavity, and the molding is performed. Thus, the molded portion having a part formed into an opening is formed. According to the second means, similarly to the first means, not only the grip portion but the opening, which is longer than the width of the grip portion and defined by the grip portion and the other predetermined mold members, is formed. Thus, the grip portion is enabled to perform relative movement in the opening. Consequently, the formed molded portion can extremely easily be removed from the seal portion of the molded portion. The workability at the manufacture thereof can dramatically be enhanced. Moreover, similarly to the aforementioned first means, it is unnecessary that the opening is provided so as to be very long. Consequently, the shape holding performance and the sealing performance of the weather strip can be prevented from being degraded. Furthermore, a maintenance operation to be performed on the core mold when damaged is not needed very much. Consequently, the cost thereof can be prevented from being increased.

Third Means

According to another aspect of the invention, there is provided a method for manufacturing a weather strip having an extruded portion, which is formed by extrusion and has a base portion and a hollow seal portion formed integrally with the base portion, and a molded portion, which is formed by a molding device provided with plural mold members so as to connect end parts of the extruded portion or as to be connected to an end of the extruded portion and which has a base portion and a seal portion. This method comprises a step of using, when the molded portion is formed, a core mold member including a core body extending along a longitudinal direction of the seal portion so as to form at least the hollow seal portion of the molded portion and also including the grip portion protruding from the core body so as to intersect therewith, and setting the core mold member at a predetermined position in the molding device and clamping the molding device in a condition, in which both or one of ends of the seal portion of the extruded portion are fitted onto both or one of ends of the core body, a step of filling a material in a cavity formed in the clamped molding device and performing molding; and a step of performing, after molded, mold-opening of the molding device and removing the molded portion therefrom. According to this method, as the molding is performed, the molded portion having an opening, which is longer than the grip portion, is formed of the grip portion and the other mold members. Further, after the molding, the grip portion is caused to perform relative movement along a longitudinal direction thereof thereby to enable the one end side of the core body to be faced from the opening, and thereafter, the other end side of the core body is removed from the seal portion of the molded portion.

According to the third means, when the molded portion is formed, the core mold member including the core body and the grip portion provided so as to protrude from the core body and as to intersect therewith is used. Further, in a condition, in which both or one of ends of the seal portion of the extruded portion are fitted onto both or one of ends of the core body, the molding device is clamped. Then, the material is filled into the cavity formed in the clamped molding device, and the molding is performed. After the molding, the mold-opening is performed, and the molded portion is removed therefrom. As the molding is performed, the molded portion having an opening, which is longer than the grip portion, is formed of the grip portion and the other mold members. Further, the grip portion is caused to perform relative movement in the opening thereby to enable the one end side of the core body to be faced from the opening, and the one end side thereof is easily removed. Thereafter, the other end side of the core body is moved in the opposite direction. Thus, the other end side of the core body is removed from the seal portion of the molded portion. Consequently, the formed molded portion is easily removed. Thus, the third means obtain effects similar to those of the aforementioned first and second means.

Fourth Means

In an embodiment (hereunder referred to as a fourth means) of one of the first to third means, the other mold members include a fixed mold member and a sliding mold member provided so as to be able to slide with respect to the fixed mold member. Further, a part of the opening is formed between the sliding mold member and the core mold member by sliding the sliding mold member.

According to the fourth means, the sliding mold member provided slidably with respect to the fixed mold member is slid, so that a part of the opening is formed between the sliding mold member and the core mold member. Therefore, the structure thereof is not complexed. Moreover, complex operation processes are unnecessary. The aforementioned advantages can be obtained.

Fifth Means

In an embodiment (hereunder referred to as a fifth means) of one of the first to fourth means, a longitudinal length of a clearance, in which the grip portion is enabled to perform relative movement, in the opening is equal to or more than a length of a part of the extruded portion, which is fitted onto the core body.

According to the fifth means, the longitudinal length of the clearance, in which the grip portion is enabled to perform relative movement, in the opening is set to be equal to or more than the length of a part of the extruded portion, which is fitted onto the core body. Thus, a sufficient amount of the relative movement can be secured. In other words, the maximum relative movement is performed, so that the one end side of the core body can more surely be approached from the opening. Consequently, the removal operation can be facilitated still more.

sixth Means

In an embodiment (hereunder referred to as a sixth means) of one of the first to fifth means, the base portion is a cross-sectionally substantially U-shaped or L-shaped trim portion. Further, the opening is formed in a side wall portion or a bottom wall portion at a side, in which the seal portion is formed, in the trim portion of the molded portion.

According to the sixth means, the opening is formed in the side wall portion at the side, in which the seal portion is formed, in the trim portion of the molded portion or in the bottom wall portion. Thus, regarding the obtained weather strip, the influence of the presence of the opening on the sealing performance can be reduced as much as possible.

seventh Means

In an embodiment (hereunder referred to as a sixth means) of one of the first to fifth means, the base portion is a cross-sectionally substantially U-shaped or L-shaped trim portion. Further, the opening is formed in a part of the seal portion.

According to the seventh means, the opening is formed in a part of the seal portion. Thus, regarding the obtained weather strip, the influence of the presence of the opening on the shape holding performance and the mounting performance thereof can be reduced as much as possible.

Eighth Means

According to another aspect of the invention, there is provided a weather strip molding device for molding a molded portion, which connects both terminal parts of or is connected to one end of an extruded portion formed by extrusion so as to have a base portion and a hollow seal portion formed integrally with the base portion and which has a base portion and a seal portion. This apparatus comprises a fixed mold member having a predetermined molding surface, a movable mold member provided so as to be contactable with and separatable from the fixed mold member and as to have a predetermined molding surface, one or plural sliding mold members provided so as to be contactable with and separatable from the fixed mold member, as to have a predetermined molding surface, and as to be slidable, and a core mold member including a core body extending along a longitudinal direction of the seal portion so as to form at least the hollow seal portion of the molded portion and also including the grip portion protruding from the core body so as to intersect therewith. According to this apparatus, the core body has an insertion part, onto which the extruded portion is fitted, and a molding part for molding at least the seal portion. Further, the grip portion is provided at the molding part in such a manner as to be shorter than a length of the molding part. Furthermore, a convex portion is provided on at least one of the sliding mold members so as to correspond to a part, in which the grip portion of the molding part is not provided, and as to protrude therefrom and as to be able to be in surface-abutting contact with the molding part.

According to the eighth means, although the grip portion extending from the molding part of the core body is configured so as to be shorter than the length of the molding part, the convex portion provided in a portion, in which the grip portion is not provided, in the molding part can be in surface-abutting contact with at least one of the sliding mold members. Thus, after the molding, the opening defined by the convex portion and the grip portion is formed. Then, the sliding mold member is slid, so that the clearance corresponding to the convex portion is formed in the opening portion. Thus, the grip portion is enabled to perform relative movement in the opening. Then, both components (the molded portion and the core mold member) are caused to perform relative movement, so that the insertion part of the core body can be moved to the opening or to a part being close to the opening. Thus, the core body can extremely easily be removed from the seal portion of the molded portion. The workability at the manufacture thereof can dramatically be enhanced. Moreover, similarly to the aforementioned means, at the removal, the core mold member and the molded portion can be caused to perform relative movement. Thus, it is unnecessary that the opening is provided so as to be very long. Consequently, the shape holding performance and the sealing performance of the finally obtained weather strip can be prevented from being degraded. Furthermore, because it is unnecessary to configure the core mold member by dividing thereof, a maintenance operation to be performed on the core mold when damaged is not needed very much. Consequently, the cost thereof can be prevented from being increased.

Ninth Means

In an embodiment (hereunder referred to as an eighth means) of one of the eighth means, a length of the convex portion, which is measured in a direction along a longitudinal direction of the seal portion, is equal to or more than a length of the insertion part.

According to the ninth means, the length of the convex portion, which is measured in a direction along the longitudinal direction of the seal portion, is equal to or more than the length of the insertion part. Thus, a sufficient clearance is secured. The sufficient amount of the relative movement can be ensured. In other words, the maximum relative movement is performed to thereby more surely enable the insertion part of the core body to be approached from the opening. Consequently, the removal operation can be facilitated still more.

DETAILED DESCRIPTION OF THE PREFERRED EMBODIMENTS

Hereinafter, an embodiment obtained by embodying a weather strip as an opening trim weather strip mounted along the peripheral edge of a door opening portion of a vehicle is described with reference to the accompanying drawings.

Figure 1:
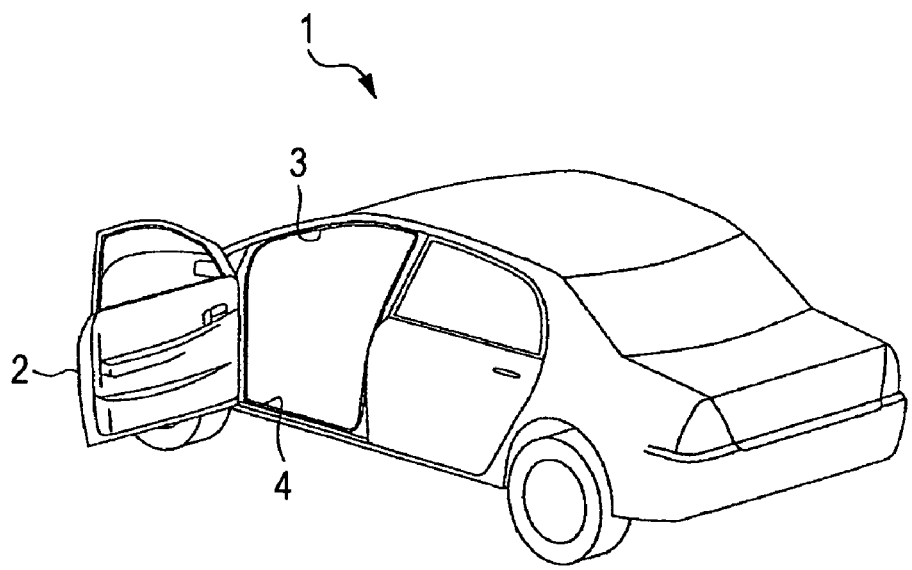
FIG. 1 is a perspective view illustrating an automobile to which a weather strip according to the invention is applied.
Figure 2:
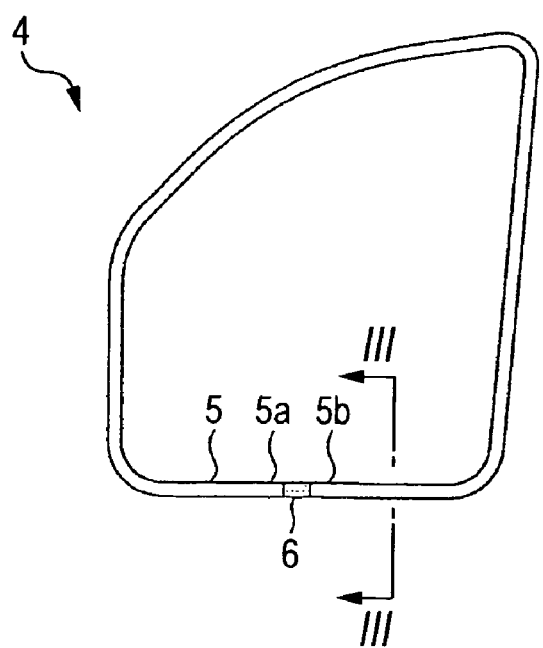
FIG. 2 is a front view schematically illustrating the rough configuration of a weather strip.

As shown in FIGS. 1 and 2, a weather strip 4 is provided along the peripheral edge of a body-side door opening 3 corresponding to a side door 2 of an automobile 1. The weather strip 4 of this embodiment is mounted over the entire peripheral edge of the door opening 3. Most of the weather strip 4 is molded by an extrusion method. Only a substantially central part (a part with a dot pattern shown in FIG. 2) of a lower portion thereof is the molded portion. That is, the weather strip 4 is configured like a ring by one extruded portion 5 and one molded portion 6, end parts 5a and 5b of which are connected to each other.

Figure 3:
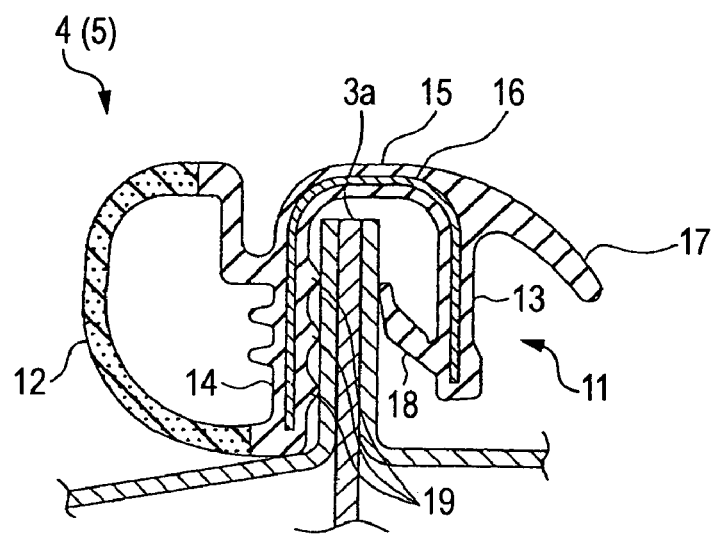
FIG. 3 is a cross-sectional view illustrating a general cross-section of an extruded portion that is in a mounted state, which is taken along line III-III of FIG. 2.

FIG. 3 is a cross-sectional view illustrating the extruded portion 5 that constitutes a major portion of the weather strip 4. The extruded portion 5 has a trim portion 11, which serves as a base portion, and a hollow seal portion 12. The trim portion 11 comprises an automobile interior side wall portion 13, an automobile exterior side wall portion 14, and a connecting portion 15 for connecting both the side wall portions 13 and 14, and is cross-sectionally substantially U-shaped. Further, the trim portion 11 is made of, for example, EPDM (ethylene-propylene-diene ternary copolymer) solid rubber. A metallic insert 16 is embedded therein. Furthermore, a cover lip 17 extending to an automobile interior is formed integrally with the connecting portion 15 of the trim portion 11. Additionally, a holding lip 18 is provided on the inner surface of the automobile interior side wall portion 13 so as to protrude therefrom, while plural holding ridges 19 are provided on the inner surface of the automobile exterior side wall portion 14. Moreover, the hollow seal portion 12 is formed integrally with the automobile exterior side wall portion 14, and made of, for instance, EPDM sponge rubber.

Figure 4:
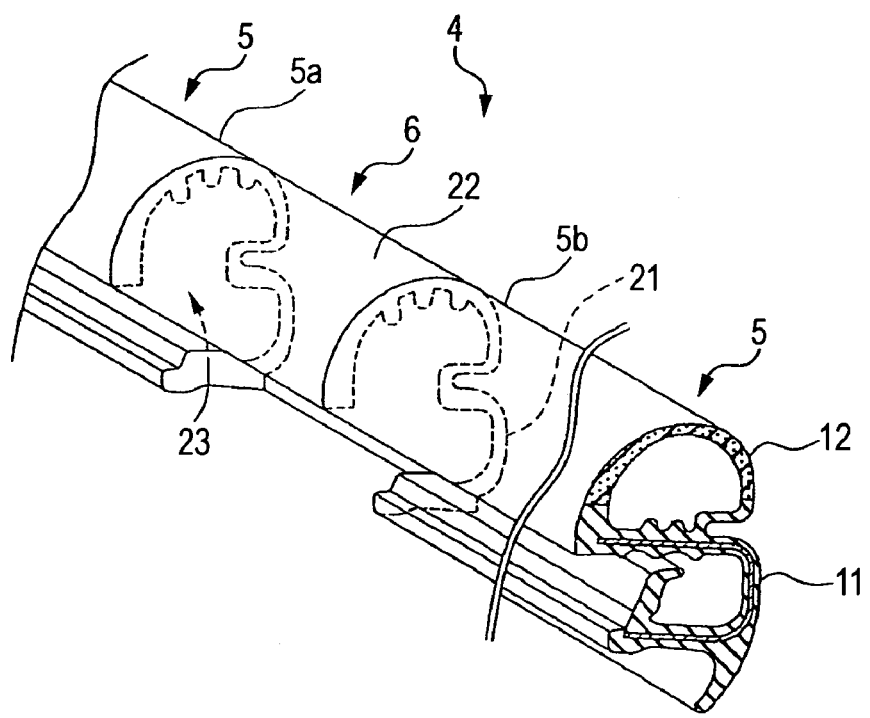
FIG. 4 is a partially cutaway, partially perspective view illustrating the weather strip.

Meanwhile, as shown in FIG. 4, basically, the molded portion 6 has a cross-sectional configuration similar to that of the extruded portion 5. That is, similarly, the molded portion 6 has a trim portion 21 and a seal portion 22. Incidentally, the molded portion 6 differs from the extruded portion 5 in that the trim portion 21 is made of EPDM sponge rubber, similarly to the seal portion 22, that most of the automobile exterior side wall portion, the cover lip, and the holding lip and the holding ridges are omitted, and that no insert is provided therein. Further, because most of the automobile exterior side wall portion is omitted, an opening 23 for getting out a core mold member (to be described later) is formed therein. Incidentally, hereunder, the mold members, such as the core mold member and the fixed mold member, are referred to by omitting the word "member".

The weather strip 4 constructed as described above is mounted by fitting the trim portions 11 and 21 to the flange 3a of the door opening 3, as shown in FIG. 3. Further, when a door 2 is shut in the aforementioned mounted state, the seal portions 12 and 22 elastically abut against the outer peripheral portion of a door panel and deform. Consequently, the seal portions 12 and 22 are brought into close contact with the outer peripheral edge of the door panel, so that an automobile interior is sealed from the outside.

Figure 5:
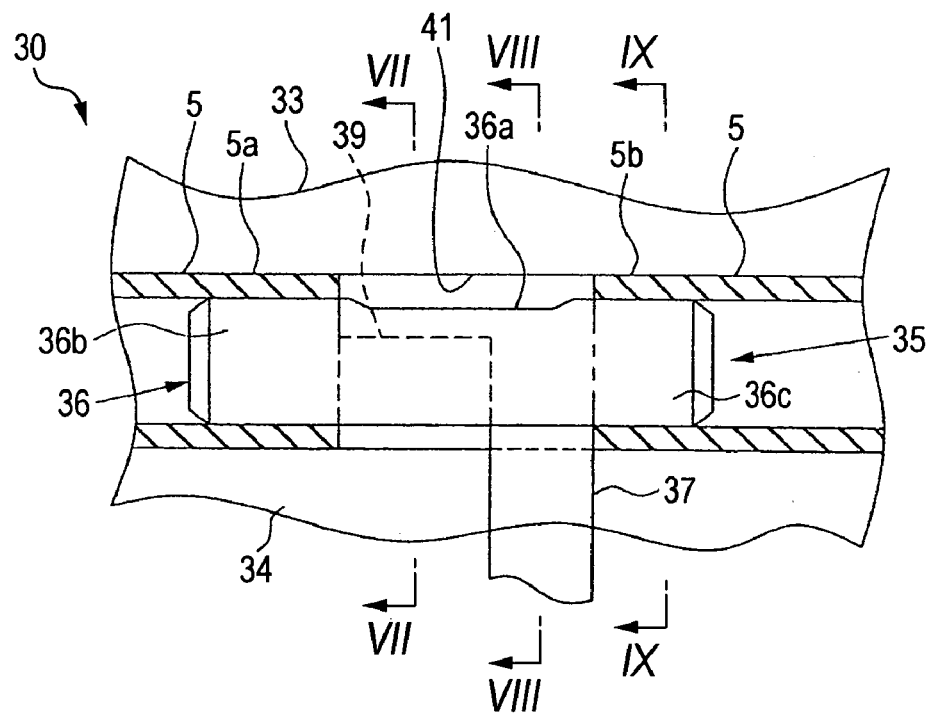
FIG. 5 is a cutaway plan view schematically illustrating a molding device in a state, in which the extrusion portion is attached thereto, by omitting an upper mold.
Figure 6:
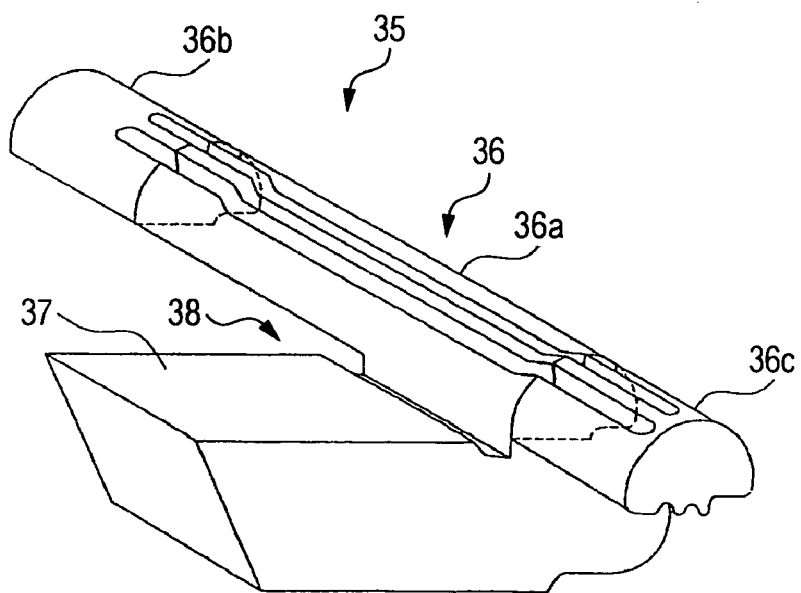
FIG. 6 is a perspective view illustrating a core mold.
Figure 7:
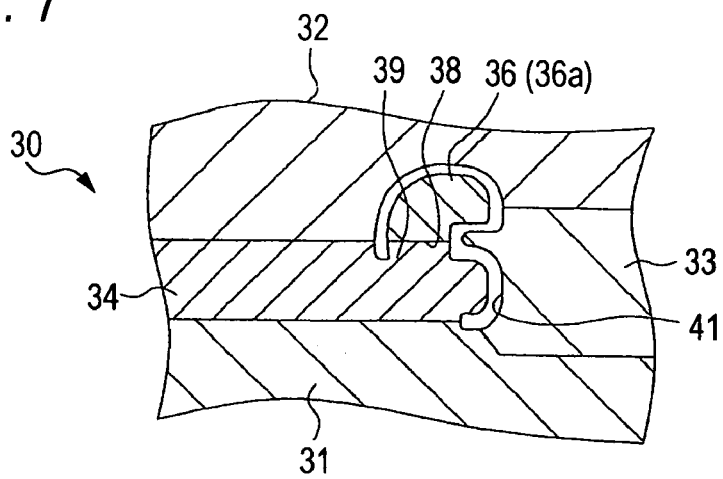
FIG. 7 is a cross-sectional view illustrating the core mold, which is taken along line VII-VII of FIG. 5.
Figure 8:
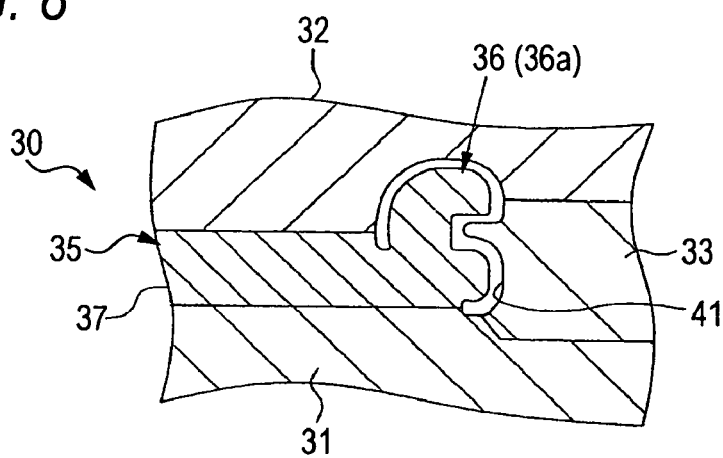
FIG. 8 is a cross-sectional view illustrating the core mold, which is taken along line VIII-VIII of FIG. 5.
Figure 9:
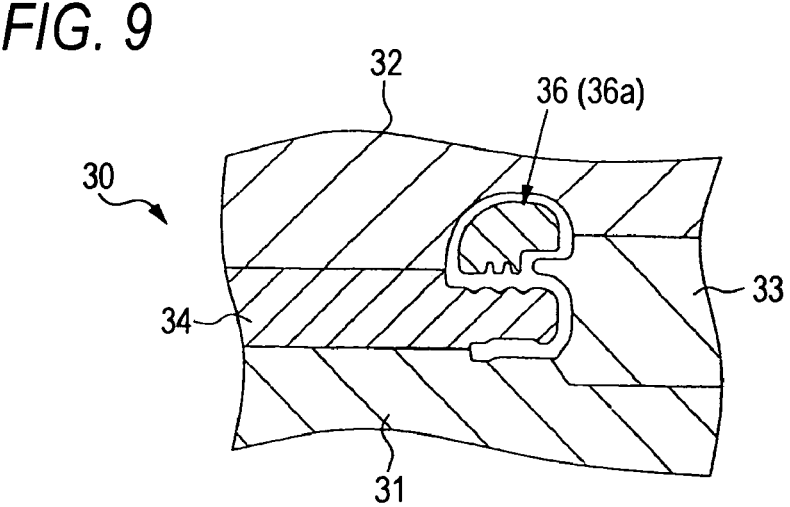
FIG. 9 is a cross-sectional view illustrating the core mold, which is taken along line IX-IX of FIG. 5.

Next, a molding device 30 for molding the molded portion 6 of the aforementioned weather strip 4 is described hereinbelow. FIG. 5 is a schematic plan view illustrating a state in which an upper mold 32 (to be described later) is omitted from the molding device 30. FIG. 6 is a perspective view illustrating a core mold 35. FIG. 7 is a cross-sectional view taken along line VII-VII of FIG. 5. FIG. 8 is a cross-sectional view taken along line VIII-VIII of FIG. 5. FIG. 9 is a cross-sectional view taken along line IX-IX of FIG. 5.

As shown in these figures, the molding device 30 has a lower mold 31, which is a fixed mold, and an upper mold 32, which is a movable mold, and also has a first sliding mold 33, a second sliding mold 34, and the core mold 35. In this embodiment, the upper mold 32 is provided so as to be able to move in a contacting/separating direction with respect to the lower mold 31. Further, the first sliding mold 33 and the second sliding mold 34 are provided in such a manner as to be slidable between the upper mold 31 and the lower mold 32 (laterally slidable, as viewed in FIGS. 7 to 9).

Further, the core mold 35 is used mainly for forming the inner peripheral walls of the seal portion 22 and the trim portion 21 of the molded portion 6, and has a core body 36 and a core holding portion 37 that serves as a grip portion and that extends from the core body 36 in a direction of the second sliding mold 34 (a downward direction, as viewed in FIG. 5, and a leftward direction, as viewed in FIG. 8). The core body 36 comprises a molding part 36a, which is positioned at the center in the longitudinal direction, and insertion parts 36b, and 36c respectively formed at both ends of the molding part 36a so as to protrude therefrom so that end parts 5a and 5b of the extruded portion 5 are inserted to the parts 36b and 36c, respectively.

Incidentally, in this embodiment, the core holding portion 37 does not extend from the entire longitudinal region of the molding part 36a. Instead, the core holding portion 37 extends from a part of only a one-side portion of the molding part 36a of the core body 36. In other words, the width W1 of the core holding portion 37 of this embodiment is, for example, about one-third of the longitudinal entire width W of the molding part 36a. In a region whose width (W−W1=W2) is the remaining two-thirds or so of the width W, the core hold portion 37 is not present (see FIG. 10A). Further, this embodiment is configured so that a part for molding the trim portion 21 of the molded portion 6 is absent and a cutout portion 38 is formed in a part, in which the core holding portion 37 is not present, in the core body 46 (see FIG. 6). Instead, a convex portion 39 corresponding to the cutout portion 38 is formed integrally with the second sliding mold 34. In a state in which the molds 31 to 35 are installed, the convex portion 39 is fitted to the cutout portion 38 (a lower portion of the molding part 36a), so that the top surface of the convex portion 39 and the bottom surface of the molding part 36a are brought into surface-abutting (or what is called "zero-abutment") contact with each other. Additionally, in this embodiment, the width (W2) of the cutout portion 38 (or the convex portion 39), in which the core holding portion 37 is not present, is set to be longer than the lengths of the insertion parts 36b and 36c.

Next, the method for manufacturing the aforementioned weather strip 4 is described herein below by focusing description, especially, on the process of molding the molded portion 6 by using the molding device 30.

First, the extruded portion, which is preliminarily extrusion-molded and cut to a predetermined length, is prepared. This elongated extruded portion 5 is bent so as to correspond to the shape of the door opening 3. Then, the end parts 5a and 5b of the extruded portion 5 are inserted to (or fitted onto) the insertion parts 36b and 36c of the core body 36, respectively. Subsequently, the core mold 35, in which the lower mold 31, the first sliding mold 33, the second sliding mold 34 and the extruded portion 5 are set, is set at a predetermined place (see FIG. 5). Then, the upper mold 31 is set thereon and clamped. Thus, a cavity 41 for the molded portion 6 (a space for molding) is formed (see FIGS. 7 and 8). Incidentally, at that time, as shown in FIG. 9, the end part 5b of the extruded portion 5 is set, though the drawing of the endpart 5b is omitted in this figure, for convenience of drawing.

Then, EPDM sponge rubber is supplied into the cavity to thereby mold the molded portion. Subsequently, the molded portion 6 is vulcanized. When the shape thereof becomes stable, the weather strip 4 is removed from the molding device 30. Incidentally, at that time, the extruded portion 5 and the molded portion 6 are connected to each other.

Figure 10A:
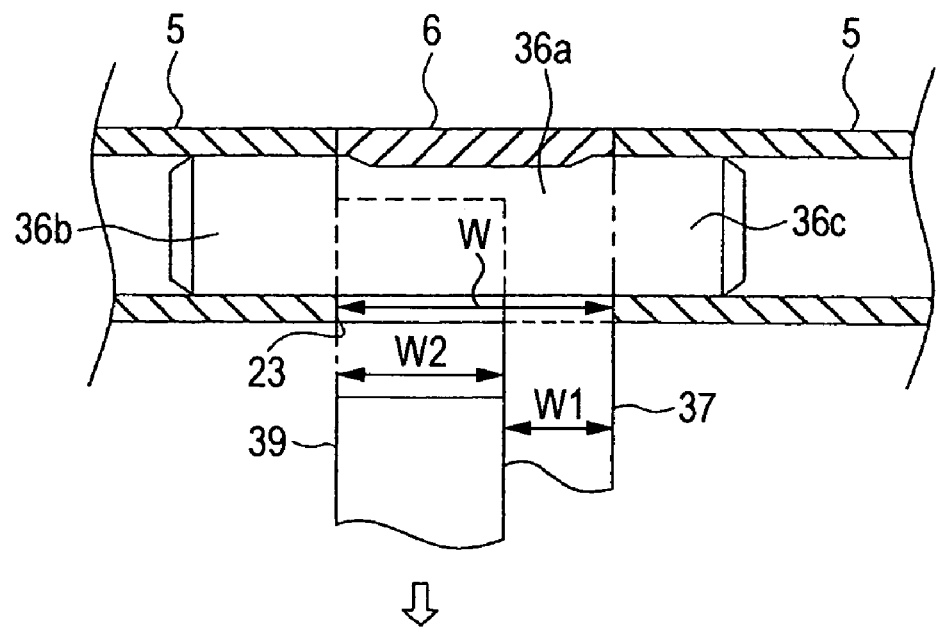
FIG. 10A is a partially cutaway schematic plan view illustrating a state in which a second sliding mold is slid.

When the weather strip is removed, first, the upper mold 32 is opened. Then, the first sliding mold 33 is slid (upwardly, as viewed in FIG. 5), while the second sliding mold 34 is slid (downwardly, as viewed in FIG. 5). Thus, as the second sliding mold 34 slides, the convex portion 39 is separated from the cutout portion 38 as shown in FIG. 10A, so that a space corresponding to the cutout portion 38 is formed. Moreover, as the space is formed, an opening 23, whose length is equal to that of the molding part 36a, is formed in the molded portion 6. Thus, in this opening 23, a clearance (or gap), in which the relative movement of the core holding portion 37 is possible, is formed. In other words, the core holding portion 37 and the molded portion 6 are put into a state in which these portions can perform relative movement by a distance being equal to the width W2.

Figure 10B:
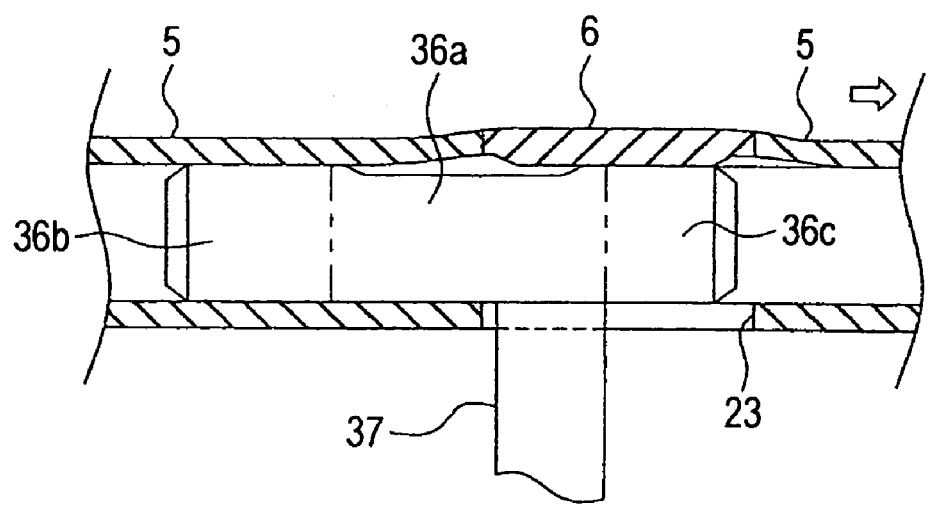
FIG. 10B is a cross-sectional schematic view illustrating a state in which a relative movement of a molded portion is performed.
Figure 11:
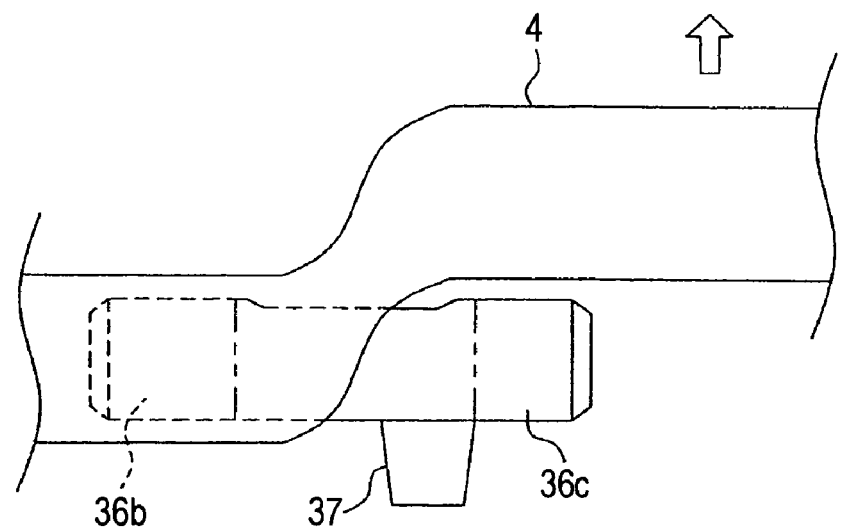
FIG. 11 is a schematic front view illustrating a manner in which the molded portion is taken out.

Then, the molded portion 6 and the core mold 35 are caused to perform relative movement. That is, hereunder, a description is given of the case of shifting the molded portion 6 without shifting the core mold 35. In the aforementioned state, the molded portion 6 is pulled by a length, which is nearly equal to the width S2, in a direction (a rightward direction, as viewed in FIGS. 10(a) and 10(b)), in which the gap is eliminated. Thus, as shown in FIG. 10B, the terminal of one 36c of the insertion parts of the core mold 36 is positioned inwardly from the terminal of the opening 23 (the right-side terminal thereof, as viewed in this figure), so that the insertion part 36c is brought into an exposed condition. In this condition, the molded portion 6 is removed from the insertion part 36c. Consequently, as shown in FIG. 11, the one 36c of the insertion parts of the core body 36 can extremely easily be dismounted. Thereafter, the molded portion 6 is pulled in a direction opposite to the aforementioned direction. Thus, the terminal of the other insertion part 36b of the core mold 36 is placed inwardly from the terminal of the opening 23 (the left-side terminal thereof, as viewed in this figure), so that the insertion part 36b is put into an exposed condition. In this condition, the molded portion 6 is removed from the insertion part 36b. Consequently, the core body 36 can extremely easily be dismounted from the molded portion 6. Thus, the weather strip 4 having the aforementioned configuration is obtained.

As described in detail above, the opening 23 is formed when the molded portion 6 is formed. However, in this embodiment, not only the core holding portion 37 but the opening 23, which is longer than the core holding portion 37 and defined by the core holding portion 37 and the second sliding mold 34, are formed. That is, the second sliding mold 34 is slid from the molded portion 6 to thereby form the space corresponding to the convex portion 39 (the cutout portion 38). The clearance is formed in the longitudinal direction thereof. Thus, the opening 23 (or the molded portion 6) is enabled to perform relative movement with respect to the core holding portion 37. Then, the relative movement brings the terminal of the insertion part 36c of the core body 36 into an exposed condition. The aforementioned procedure enables the extremely easy removal of the core body 36 from the molded portion. Consequently, the workability at the manufacture of weather strips can dramatically be enhanced.

Further, as described above, the core mold 35 and the molded portion 36 are enabled to perform relative movement at the removal. Thus, it is unnecessary that the opening 23 is provided therein so as to be very long. Consequently, the shape holding performance and the sealing performance of the molded portion of a finally obtained weather strip can be prevented from being degraded. Further, it is unnecessary that the core mold is configured by being divided. Thus, a maintenance operation to be performed on the core mold when damaged is not needed very much. Consequently, the cost thereof can be prevented from being increased.

Further, in this embodiment, the clearance (W2) formed by siding the second sliding mold 34 is set to be equal to or longer than the length of the end parts of the extruded portion 5 fitted onto the insertion parts 36b and 36c of the core body 36. Therefore, a sufficient amount of the relative movement can be secured. In other words, the insertion parts 36b and 36c of the core body 35 can more surely be faced from the opening 23 by performing the maximum relative movement. Consequently, the removal operation can more easily be achieved.

Additionally, in this embodiment, the opening 23 is formed in the side wall portion on the side, in which the seal portion 22 is formed, of the trim portion 21 of the molded portion 6. Thus, regarding the obtained weather strip 4, the influence of the presence of the opening 23 on the sealing performance can be reduced as much as possible.

Incidentally, the invention is not limited to the aforementioned embodiment. For example, the apparatus of the invention may be configured as follows.

Figure 12:
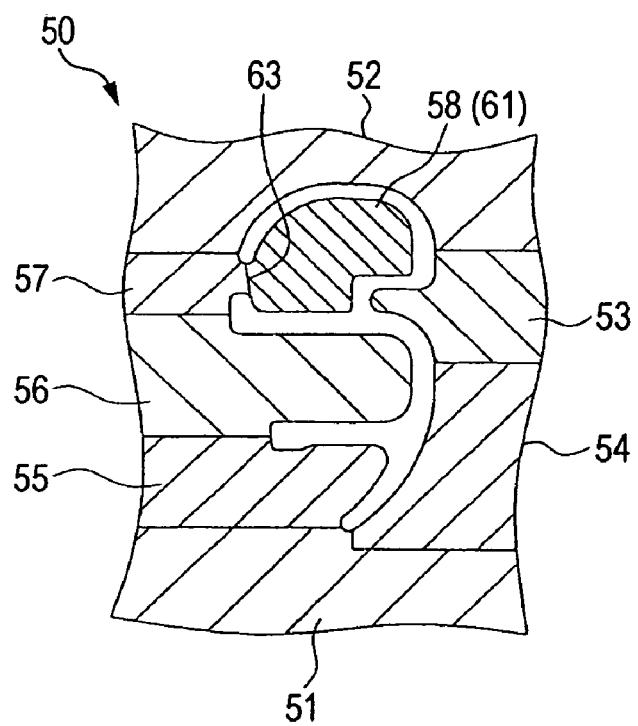
FIG. 12 is a cross-sectional view illustrating a molding device according to another embodiment.
Figure 13:
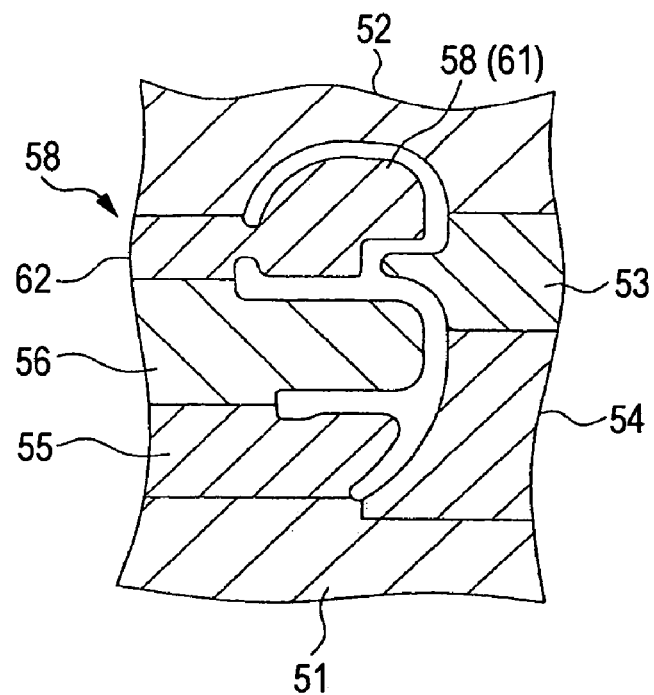
FIG. 13 is a cross-sectional view illustrating a molding device according to the embodiment.
Figure 14:
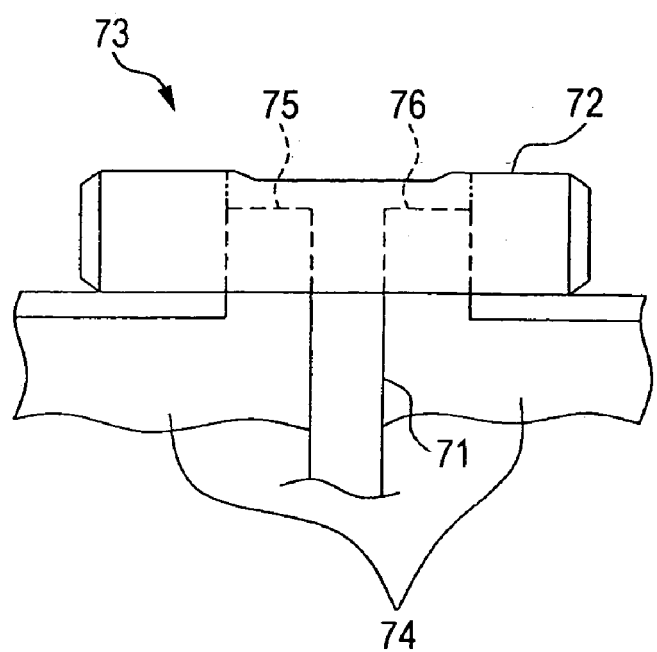
FIG. 14 is a plan view illustrating a core mold in another embodiment.

(a) In the case of the aforementioned embodiment, the opening 23 is formed in the sidewall portion of the trim portion 21 of the molded portion 6. Instead, the opening may be formed in a part of the seal portion. For instance, FIGS. 12 and 13 are cross-sectional views of a molding device 50, which correspond to FIGS. 7 and 8. The molding device 50 has a lower mold 51, an upper mold 52, a first sliding mold 53, a second sliding mold 54, a third sliding mold 55, a fourth sliding mold 56, a fifth sliding mold 57, and a core mold 58. Further, the core mold 58 has a core body 61 and a core holding portion 62 serving as a grip portion. Moreover, a convex portion 63 having an amount of projection, which is less than that of the convex portion 39, and being in surface-abutting contact with the core body 61 is formed integrally with an end of the fifth sliding mold 57. Thus, regarding the obtained molded portion, the cross-sectionally substantially U-shaped trim portion can be secured by using a relatively large number of sliding molds 53 to 57. In other words, the opening is formed in a part of the seal portion. Thus, regarding the obtained weather strip, the influence of the presence of the opening on the shape holding performance and the mounting performance thereof can be reduced as much as possible.

(b) In the case of the aforementioned embodiment, the core holding portion 37 is provided toward the side of the one 36c of the insertion parts of the core body 36. Instead, instead, a core mold 73 having a core holding portion 71 provided at a substantially center of a core body 72 may be employed. Furthermore, convex portions 75 and 76 of a sliding mold 74 may be provided along both sides of the core holding portion 71 so as to protrude therefrom. With such a configuration, the core body can easily be removed even when the relative movement is performed toward either the left side or the right side after the molding.

(c) Although the invention is embodied in the case of molding the molded portion 6, which linearly connects both terminals 5a and 5b of the extruded portion 5, in the aforementioned embodiment, the molded portion may correspond to corner portions. Furthermore, the case, to which the invention is applied, is not limited to that of molding the molded portion, which linearly connects both terminals of the extruded portion. The invention may be applied to the case of molding the molded portion connected to one of the terminals of the extruded portion.

(d) In the case of the aforementioned embodiment, the invention is embodied as the weather strip 4 of the type having the cross-sectionally substantially U-shaped trim portion 11. In contrast with this, the invention may be embodied as a weather strip of the type having a cross-sectionally substantially L-shaped trim portion. Incidentally, in this case, side wall parts of the trim portion can be mounted on, for example, the flange by being attached thereto through the use of, for instance, double-sided adhesive tape.

(e) In the case of the aforementioned embodiment, the invention is embodied as the opening trim weather strip 4 mounted along the peripheral edge of the door opening 3. Instead, the invention may be embodied as opening trim weather strips mounted along the peripheral edges of openings for back doors, trunk lids, sliding doors, and a sliding roof. Needless to say, the invention can be applied to a weather strip attached to a door panel. In short, the invention can be applied to other weather strips, as long as each of the weather strips of the type, which has a base portion and a hollow seal portion, and also has a molded portion provided at an end part of the extruded portion.

(f) Needless to say, the invention may be applied to the case of manufacturing a weather strip by connecting plural extruded portions through plural molded portions.

(g) Although EPDM sponge rubber is employed as the material of the molded portion 6 in the aforementioned embodiment, EPDM solid rubber or TPO (thermoplastic polyolefin elastomer) or the like may be employed as the material thereof.

What is claimed is:

1. A method for manufacturing a weather strip having:
    an extruded portion formed by extrusion and having a base portion and a hollow seal portion formed integrally with said base portion; and
    a molded portion formed by a molding device provided with plural mold members so as to connect ends of said extruded portion or as to be connected to an end of said extruded portion and which has a base portion and a seal portion, the method comprising steps of:
    providing a one-piece core mold member including a core body extending along a longitudinal direction of said hollow seal portion for forming at least said seal portion of said molded portion and a grip portion extending from said core body so as to intersect therewith,
    setting said one-piece core mold member in said molding device and clamping said molding device such that at least one end of said hollow seal portion of said extruded portion is fitted onto an end of said core body;
    filling a cavity of said clamped molding device with a molding material;
    molding said molded portion in which an opening longer than a width of said grip portion is formed, wherein the opening is formed between a sliding mold member and said one-piece core mold member when the sliding mold member is removed in a part at which the sliding mold member and the core body are brought into contact to block flow of the molding material; and
    thereafter performing mold-opening of said molding device and removing said molded portion therefrom,
    wherein after the molding, said grip portion is caused to perform a relative movement in said opening along a longitudinal direction of said opening thereby to expose one end side of said core body from said opening, and thereafter, another end side of said core body is removed from said seal portion of said molded portion.

2. A method for manufacturing a weather strip according to claim 1, wherein a longitudinal length of a clearance, in which said grip portion is enabled to perform the relative movement in said opening is equal to or more than a length of a part of said extruded portion, which is fitted onto said core body.

3. A method for manufacturing a weather strip according to claim 1, wherein said base portion includes a trim port ion having substantially a U-shaped or L-shaped trim portion in cross section; and
    said opening is formed in a side wall portion or a bottom wall portion at a side, in which said seal portion is formed, in said trim portion of said molded portion.

4. A method for manufacturing a weather strip according to claim 1, wherein said base portion includes a trim port ion having substantially a U-shaped or L-shaped trim portion in cross section; and
    said opening is formed in a part of said seal portion.

* * * * *